Patented Apr. 13, 1937

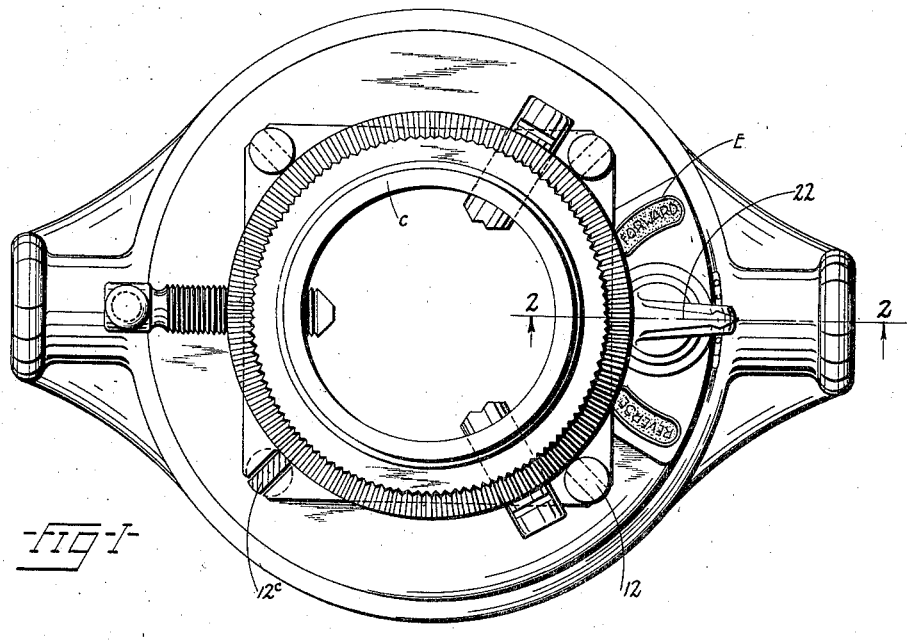
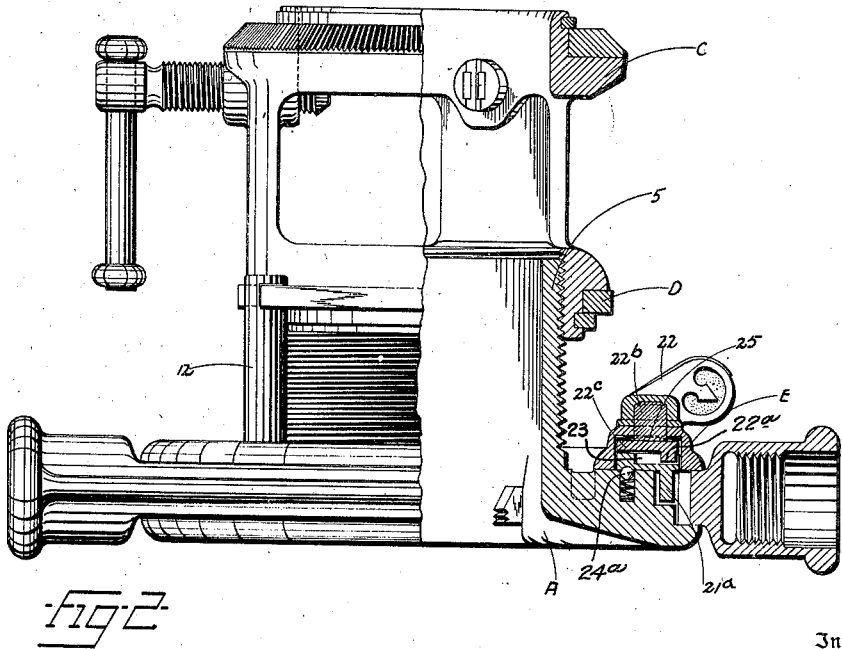

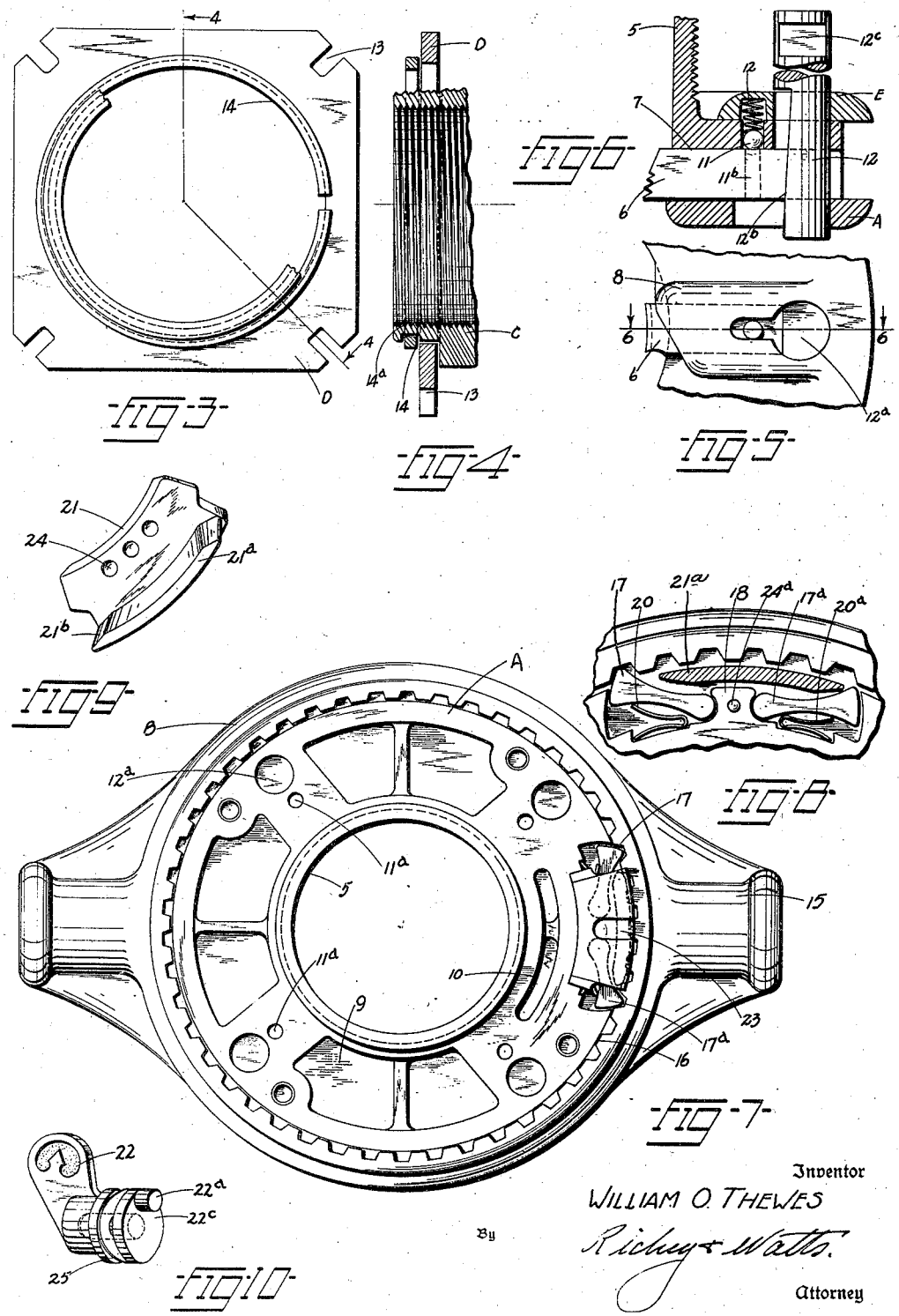

2,076,831

UNITED STATES PATENT OFFICE 2,076,831

THREADING DIE

William O. Thewes, North Ridgeville, Ohio, assignor to The Ridge Tool Company, North Ridgeville, Ohio, a corporation of Ohio Application January 2, 1935, Serial No. 4

4 Claims. (Cl. 10—120.5)

This invention relates to pipe threading tools or die stocks, and the primary object in view is to generally improve tools of this class.

More specific objects are:

To provide a pipe threading tool or die stock which may be easily and quickly changed over from a ratchet type die stock to a solid type die stock and which at the same time embodies ratchet mechanism which is capable of withstanding relatively great thrust.

To provide an improved threading tool or die stock assembly of the cam post type;

To provide a stronger and generally improved mounting for the chasers or cutters of thread-cutting tools;

To provide a thread cutter or die stock assembly embodying a die-carrier or housing which is so designed that it may be made as a die casting without sacrificing the necessary strength to support the cutters or chasers.

The foregoing and other objects and advantages will become apparent in view of the following description taken in conjunction with the drawings, wherein:

Figure 1 is a view in end elevation of a thread cutting tool or die stock embodying the features of the invention, one of the chaser cam posts being shown in section;

Fig. 2 is a view in section and side elevation, the part in section being taken along the line 2—2, Fig. 1;

Fig. 3 is a fragmentary view in end elevation of the work-holder and cam post plate, showing the preferred method of assembling and mounting these parts, and Fig. 4 is a section taken on the line 4—4, Fig. 3, the inner end portion only of the work holder being shown;

Fig. 5 is a fragmentary view of a portion of the chaser-carrier or housing, and

Fig. 6 is a sectional view taken on the line 6—6, Fig. 5;

Fig. 7 is an elevational view of the chaser-carrier or housing and ratchet or drive ring in assembled relation together with the ratchet mechanism;

Fig. 8 is an enlarged fragmentary view of the ratchet mechanism and adjacent parts;

Figs. 9 and 10 are detail perspective views of a pawl cam and cam lever.

The improved tool comprises a chaser-carrier plate or housing, generally indicated at A, a drive or ratchet ring generally indicated at B, a work-holder generally indicated at C, a cam post plate D, and a backing plate E, together with coacting parts which will be referred to more or less in detail in the following description.

The chaser carrier or housing is preferably made of die cast material, or is a die casting. The preferred construction of this part of the assembly is best shown in Fig. 7. The central portion of the housing is formed with a threaded barrel 5 on which the work-holder C is adapted to be threaded. The chasers or cutters are indicated at 6, note particularly Figs. 5 and 6, the outer end or side of the carrier housing being formed with a plurality of radial slots 7 in which the chasers are mounted for limited radial movement. The metal around these slots is built up as at 8, to thereby reinforce the slots and the latter are provided when the plate is cast instead of being machined, as in prior known tools of this type. Chaser slots formed by machining are of necessity open at one side to provide for entrance of a milling cutter. In contradistinction, the slots of the present improved tool are closed on both sides and strongly reinforced at the side which has to take the greatest thrust during the threading operation. The cut out portions indicated at 9 and 10 are simply to lighten the casting without detracting from its strength.

The chasers 6 are each preferably resiliently held in position by means of a resiliently-mounted detent member or latch ball 11, note particularly Fig. 6, which is inserted in a hole 11a formed in the housing or carrier A and urged into a seat 11b formed in each of the chasers 6 by a spring 12, the latter being partly housed in the backing plate E. The hole 11a is tapered or constricted toward its lower end, so that the latch ball 11 may be inserted in the upper end of the hole and will lodge near the bottom, but will project sufficiently to engage in seat 11b. This arrangement facilitates assemblage of the respective parts, and the ball is fully housed and protected and out of the way.

The present tool is of that type wherein the cutters are permitted a certain amount of retraction or backing-off movement during the threading operation in order to provide a certain amount of taper to the threaded pipe end. Cam posts 12 are provided and at their lower extremities project through registering holes 12a formed in the backing plate E and chaser-carrier A and terminating in rear of the cutter slots 7. Each of the posts 12 are formed with a tapered cam or drift surface 12b against which the rear end of each chaser 6 abuts, so that as the pipe is threaded and the housing A and coacting parts advance into the work-holder, the chasers will back off slightly, as is well understood by those having a knowledge of this type of thread cutting tool.

Another feature of the present invention is the method of anchoring or mounting the cam posts 12, which is accomplished by the post plate D. This post plate is detachably associated with the work-holder C, instead of being made an integral part therewith or with some other part of the assembly, and as a consequence it may be made of tool steel or the like, and may be replaced when worn, and in general provides a lighter and stronger yet more economical construction than known tools wherein the posts are anchored by an integral part of the assembly. The plate D is formed with radial corner slots 13 in which the upper extremity of each of the posts 12 is fitted, the posts being formed with a necked portion 12c for this purpose. The plate D is fitted onto the inner extremity of the work-holder C in a manner such as to provide an angular floating or rotatable mounting, so that the posts have both a radial and angular floating action. To provide a mounting which will bring about the foregoing advantages, the work-holder is formed with an annular groove 14a, and in this groove a snap ring 14 engages, thereby detachably holding the work-holder in position, note particularly Figs. 3 and 4.

The drive or ratchet ring B is provided with handle sockets 15 and is provided with a plurality of internal teeth 16. The ratchet mechanism consists of a pair of oppositely disposed pawls or dogs 17 and 17a, which have their inner extremities disposed against an abutment 18 (note Fig. 8) which is preferably formed integrally with the chaser carrier A. At the lower or outer extremity of the abutment 18, a pawl retaining boss or member 19 is provided and is also formed integrally with the said carrier. Springs 20 and 20a normally urge the pawls 17 and 17a outwardly into engagement with the teeth of the drive ring B. A pawl cam 21, shown more or less in detail in Fig. 9, is provided and is formed with a cam portion or toe 21a which rides on the boss 19 and at its opposite side edges is formed with cam surfaces 21b adapted to engage the pawls 17 and 17a and move the latter clear of the teeth 16 when the cam member 21 is moved in an arcuate path by means of the lever 22, note Fig. 10. Lever 22 is provided with an eccentrically disposed pin 22a adapted to engage in a slot 23 formed in the cam member 21, note Fig. 7. The cam member 21 is formed with a plurality of detent notches or recesses 24 adapted to engage a detent or spring-pressed ball 24a disposed in the abutment 18. The lever 22 is secured on a pin 22b which is journaled in the backing plate E and is provided with a cam disc 22c which in turn carries pin 22a. To hold the thumb lever under tension, a bent spring washer 25 is arranged to bear against the disc 22b.

In operation, assuming it is desired to rotate the cutter or die stock in a thread-cutting direction, the thumb lever 22 may be turned to the right in Fig. 1, thereby sliding the cam member 21 against the pawl 17 and moving it clear of the ratchet teeth 16 while the pawl 17a remains in driving engagement with said teeth. To run the cutter or die stock in a reverse direction or to back it off of the cut threads, the lever may be turned in the opposite direction, thereby reversing the position of the pawls, note the position of the parts in Fig. 8. Assuming it is desired to use the die as a solid die for work over a certain size, then the cam member 21 may be adjusted to intermediate position at which point both the dogs 17 and 17a engage the ratchet teeth 16 and lock the drive ring with the chaser housing. Two handle sockets 15 are preferably provided so that two men may work the same tool, or one man may use both hands to the best advantage.

It will be noted that the pawls 17, 17a are so constructed and arranged that they will transmit the driving thrust in a substantially straight line to the abutment 18, said pawls projecting at a tangent and having their faces lying in substantially the same plane as the teeth of the drive ring. This construction will stand relatively great thrust.

It will be understood that certain variations in structure and design may be adopted within the scope of the invention as defined by the appended claims.

I claim:

1. In a thread cutting tool, a chaser-carrier plate formed with a series of radial chaser slots, chasers mounted for radial movement in said slots, a work-holder operatively connected to said carrier plate, cam posts projecting into said slots for backing said chasers, and a cam post plate connected to said work-holder, said cam posts having their ends anchored for a radial floating action in said plate and said plate having an annular floating connection with said work-holder.

2. In a thread cutting tool, a chaser-carrier plate having a threaded barrel and a series of radial chaser slots, chasers mounted in said slots, a work-holder threaded on said barrel, a cam post plate rotatably connected to the inner end of said work-holder, said plate being formed with a plurality of radially open slots, and cam posts projecting into said chaser slots in rear of said chasers and having their ends anchored in said radial open slots of the said cam post plate.

3. In a thread cutting tool, a chaser-carrier plate having a threaded work-holder barrel and a series of radial chaser slots, chasers mounted for radial movement in said slots, a work-holder threaded on said barrel and having an annular peripheral groove at its inner extremity, a cam post plate rotatably disposed in said groove, a snap ring for detachably connecting said plate to said barrel, and a series of cam posts projecting into said chaser slots in rear of said chasers, said cam post plate being formed with a series of radially open slots to receive and floatingly anchor the ends of said cam posts.

4. In a thread cutting tool, a chaser-carrier plate formed of cast metal and having a series of radial chaser slots formed therein, said plate having abutments built up around the chaser slot and extending beyond the confines of the slot adjacent the trailing edge of the chasers for furnishing the chasers with lateral support during a thread cutting operation.

WILLIAM O. THEWES.